(12) United States Patent
Blaser et al.

(10) Patent No.: US 9,362,784 B2
(45) Date of Patent: Jun. 7, 2016

(54) PUMP UNIT

(75) Inventors: Georg Blaser, Asperg (DE); Rudolf Polzer, Stein (DE)

(73) Assignee: Grundfos Holding a/s, Bjerringbro (DK)

( * ) Notice: Subject to any disclaimer, the term of this patent is extended or adjusted under 35 U.S.C. 154(b) by 21 days.

(21) Appl. No.: 13/884,728

(22) PCT Filed: Nov. 3, 2011

(86) PCT No.: PCT/EP2011/069340
§ 371 (c)(1),
(2), (4) Date: Jul. 24, 2013

(87) PCT Pub. No.: WO2012/062650
PCT Pub. Date: May 18, 2012

(65) Prior Publication Data
US 2013/0300330 A1 Nov. 14, 2013

(30) Foreign Application Priority Data

Nov. 11, 2010 (DE) .......................... 10 2010 051 916
Nov. 11, 2010 (DE) .......................... 10 2010 051 918
Mar. 15, 2011 (EP) ..................................... 11002125

(51) Int. Cl.
*H02P 6/18* (2006.01)
*H02K 1/14* (2006.01)
(Continued)

(52) U.S. Cl.
CPC ................ *H02K 1/146* (2013.01); *F04B 49/06* (2013.01); *F04D 13/06* (2013.01); *F04D 13/064* (2013.01); *F04D 15/0218* (2013.01); *F04D 29/0467* (2013.01); *G05D 9/12* (2013.01); *H02K 1/148* (2013.01); *H02K 1/2753* (2013.01); *H02K 3/28* (2013.01); *H02K 5/128* (2013.01); *H02K 5/22* (2013.01); *H02K 9/197* (2013.01);
(Continued)

(58) Field of Classification Search
CPC . C12P 19/02; C12P 19/14; H01L 2924/0002; Y02E 50/16; F04D 13/064
See application file for complete search history.

(56) References Cited

U.S. PATENT DOCUMENTS 2,743,673 A * 5/1956 Kaatz ...................... F04D 13/08
310/107
2,811,107 A 10/1957 Brill
(Continued)

FOREIGN PATENT DOCUMENTS

DE 2242653 A1 3/1973
DE 22 62867 * 7/1974
(Continued)

OTHER PUBLICATIONS

Translation of EP 1203886 A2.*
(Continued)

*Primary Examiner* — Shawki S Ismail
*Assistant Examiner* — Zoheb Imtiaz
(74) *Attorney, Agent, or Firm* — Panitch Schwarze Bellisario & Nadel LLP

(57) ABSTRACT

A pumping set includes an electric motor, which exhibits a stator, a rotor and a can arranged between the stator and rotor, and at least one impeller linked with the rotor, wherein the electric motor has engine electronics designed for electronically commutating the electric motor, and the electric motor and commutation are configured in such a way that, in a state where the rotor chamber inside the can and/or the impeller is not filled with liquid, the rotor is shut down.

11 Claims, 2 Drawing Sheets

(51) Int. Cl.

| | | |
|---|---|---|
| *F04D 15/02* | (2006.01) | |
| *F04D 29/046* | (2006.01) | |
| *H02K 21/16* | (2006.01) | |
| *H02K 21/24* | (2006.01) | |
| *F04D 13/06* | (2006.01) | |
| *G05D 9/12* | (2006.01) | |
| *F04B 49/06* | (2006.01) | |
| *H02K 1/27* | (2006.01) | |
| *H02K 3/28* | (2006.01) | |
| *H02K 9/197* | (2006.01) | |
| *H02K 1/18* | (2006.01) | |
| *H02K 5/10* | (2006.01) | |
| *H02K 5/128* | (2006.01) | |
| *H02K 5/173* | (2006.01) | |
| *H02K 5/22* | (2006.01) | |
| *H02K 5/24* | (2006.01) | |

(52) U.S. Cl.
CPC .............. *H02K 11/33* (2016.01); *H02K 21/16* (2013.01); *H02K 21/24* (2013.01); *H02P 6/182* (2013.01); *H02K 1/182* (2013.01); *H02K 5/10* (2013.01); *H02K 5/1282* (2013.01); *H02K 5/1737* (2013.01); *H02K 5/225* (2013.01); *H02K 5/24* (2013.01)

(56) References Cited

U.S. PATENT DOCUMENTS

| | | | |
|---|---|---|---|
| 3,814,963 | A | 6/1974 | Laing |
| 4,043,706 | A * | 8/1977 | Walker ................ F04D 29/0467 310/104 |
| 4,051,401 | A | 9/1977 | Hayward |
| 4,352,646 | A | 10/1982 | Laing et al. |
| 4,471,253 | A | 9/1984 | Laing |
| 5,552,653 | A | 9/1996 | Nose |
| 7,015,603 | B2 | 3/2006 | Barrho et al. |
| 7,855,486 | B2 | 12/2010 | Hasegawa |
| 8,487,493 | B2 * | 7/2013 | Cunningham .......... F04D 1/063 310/90.5 |
| 8,696,331 | B2 * | 4/2014 | Cunningham .......... F04D 13/10 310/86 |
| 2002/0098089 | A1 | 7/2002 | Forsberg |
| 2005/0225192 | A1 | 10/2005 | Kloepzig et al. |
| 2008/0007126 | A1 | 1/2008 | Popov et al. |
| 2010/0090635 | A1 | 4/2010 | Andersen et al. |
| 2010/0111729 | A1 | 5/2010 | Andersen et al. |
| 2011/0241454 | A1 | 10/2011 | Staehr |

FOREIGN PATENT DOCUMENTS

| | | | | |
|---|---|---|---|---|
| DE | 2262867 | A1 | 7/1974 | |
| DE | 3436510 | A1 | 4/1986 | |
| DE | 4225148 | A1 | 2/1994 | |
| DE | 19617083 | A1 | 10/1997 | |
| DE | 19646617 | A1 | 5/1998 | |
| DE | 102004017507 | A1 | 10/2005 | |
| DE | 102004027744 | A1 | 12/2005 | |
| DE | 102006026719 | A1 | 12/2007 | |
| DE | 102007042186 | A1 | 3/2009 | |
| DE | 202007018771 | U1 | 3/2009 | |
| DE | 102009048889 | A1 | 5/2010 | |
| EP | 0688088 | A1 | 12/1995 | |
| EP | 1063751 | A1 | 12/2000 | |
| EP | 1203886 | A2 * | 5/2002 | .............. F04D 15/02 |
| EP | 1947343 | A1 | 7/2008 | |
| EP | 1947753 | A1 | 7/2008 | |
| EP | 2040350 | A2 * | 3/2009 | .............. H02K 5/128 |
| JP | 2003-018797 | A | 1/2003 | |
| WO | 9305564 | A1 | 3/1993 | |
| WO | 9835424 | A1 | 8/1998 | |
| WO | 03103114 | A1 | 12/2003 | |
| WO | 2008019818 | A1 | 2/2008 | |
| WO | 2008135103 | A1 | 11/2008 | |
| WO | 2008150334 | A1 | 12/2008 | |
| WO | WO 2008/150334 | | * 12/2008 | |
| WO | 2009006927 | A1 | 1/2009 | |
| WO | 2009012883 | A2 | 1/2009 | |
| WO | WO 2009/006927 | * | 1/2009 | |
| WO | 2010031468 | A1 | 3/2010 | |

OTHER PUBLICATIONS

Translation of EP 2040350 A2.*
Translation of WO 2008/150334.*
Translation of DE 22 62867 and WO 2009/006927.*
Int'l Search Report and Written Opinion issued Mar. 5, 2013 in Int'l Application No. PCT/EP2011/069261.
Int'l Search Report and Written Opinion issued Feb. 20, 2013 in Int'l Application No. PCT/EP2011/069260.
Int'l Search Report and Written Opinion issued Mar. 8, 2013 in Int'l Application No. PCT/EP2011/069340.
Int'l Search Report issued Mar. 15, 2013 in Int'l Application No. PCT/EP2011/069264.
Int'l Search Report issued Mar. 1, 2013 in Int'l Application No. PCT/EP2011/069262.
Office Action issued Apr. 1, 2011 in DE Application No. 10 2010 051 916.2.
Office Action issued Nov. 28, 2011 in DE Application No. 10 2010 051 918.9.

* cited by examiner

PUMP UNIT

CROSS-REFERENCE TO RELATED APPLICATIONS

This application is a Section 371 of International Application No. PCT/EP2011/069340, filed Nov. 3, 2011, which was published in the German language on May 18, 2012, under International Publication No. WO 2012/062650 A2 and the disclosure of which is incorporated herein by reference.

BACKGROUND OF THE INVENTION

Embodiments of the invention relate to a pumping set with an electric motor, which exhibits a stator, a rotor and a can arranged between the stator and rotor, and to an impeller linked with the rotor. Such pumping sets are used as recirculation pumping sets, in particular for heating and industrial water recirculation. The wet running electric motors of this pumping set exhibit liquid between the rotor and can, i.e., the rotor runs in the liquid to be conveyed. This means that when the impeller runs dry and no more liquid is being conveyed, the rotor chamber can also run dry. This is an undesirable operating state, since the liquid simultaneously also serves to lubricate the bearings.

It is therefore desitable to further develop a pumping set with an electric motor of the kind described at the outset in a way that avoids damage to the bearings caused by dry running.

BRIEF SUMMARY OF THE INVENTION

According to embodiments of the invention, the pumping set exhibits an electric motor and at least one impeller driven by the latter. The electric motor exhibits in a known manner a stator and a rotor with a can arranged between the latter, so that the rotor can run in the liquid to be conveyed.

Embodiments of the invention provide that the electric motor have engine electronics designed for electronically commutating the electric motor. Such engine electronics preferably exhibit a frequency inverter for adjusting the speed of the electric motor. It is essential to the invention that the electric motor and commutation be configured in such a way that, in a state where the rotor chamber inside the can is not filled with liquid, the rotor stops or pauses. Alternatively or additionally, the electric motor and commutation are configured in such a way that, in a state where the at least one impeller is running dry, the rotor stops or pauses. The configuration can here be selected such that rotor stoppage only occurs given a dry running impeller, a dry running rotor, or only occurs if both the impeller and rotor are running dry. As a result, the electric motor automatically stops or does not start in the dry running mode, when no liquid is located between the rotor and can, or the impeller is running dry. This makes it possible to easily avoid damage to the bearing owing to a lack of lubrication by the liquid.

The liquid in the impeller and liquid in the rotor chamber each increase the load acting on the electric motor due to the arising friction or arising resistance in the impeller. When part of this load is eliminated, the operating performance of the electric motor changes.

If the electric motor and commutation are now correspondingly configured, this change in operating performance causes a stoppage of the rotor, i.e., the rotor stops or does not even start.

The electric motor and commutation are preferably designed in such a way that, in a state where the rotor chamber is inside the can and/or the impeller is not filled with liquid, the commutation is suspended. The suspension of commutation then causes the rotor to stop, so that the latter stands still.

If the commutation is configured so as to only take place correctly if enough of a load is acting on the motor, the commutation will be suspended if a portion of the load is omitted, and the electric motor will stop. This represents a very simple way to prevent dry running During electric motor startup, the latter, if the impeller is running dry and/or the rotor chamber is not filled with liquid, can still be forced to start up depending on design, but even then, once the motor has begun controlled operation, the commutation will be correspondingly suspended, and the motor will stop once again.

In a preferred embodiment of the invention, the electric motor is designed as a spherical motor with a can in the form of a separating calotte and a semispherical rotor. In this configuration, the rotor is mounted on a spherical surface, and has an outer contour facing the can or separating calotte that is spherical, i.e., has a shape matching a spherical section. In this case, the outer contour of the rotor is in this area ideally designed concentric to the spherical surface of the bearing. The separating calotte has a correspondingly concentric design. In this way, the rotor can float around the bearing point inside the separating calotte transverse to its rotational axis. In terms of the present invention, a can is therefore to be understood as a separating element that divides the rotor chamber from the stator chamber, whether it be a tubular separating element, a dome-shaped separating element, a calotte-formed separating element or a separating element formed in some other way, for example a disk.

It is further preferred that the rotor exhibits a pole ring made out of a magnetic material, which incorporates permanent magnetic rotor poles. In the direction transverse to its circumferential extension, this pole ring preferably exhibits a width that essentially corresponds to the width of the opposing stator poles. In other words, the stator poles and rotor poles overlap each other when lying opposite one another.

It is further preferred that the stator exhibit several stator pole pairs that each are formed by two adjacent stator poles, which are designed in such a way as to generate oppositely polarized magnetic fields in a radial direction, and that the rotor exhibits a plurality of magnetic rotor poles distributed over the circumference, and is configured so as to enable a magnetic flux between two adjacent rotor poles. As a result, the magnetic flux does not take place diametrically through the rotor, but rather between the adjacent rotor poles in a circumferential direction in the rotor, in particular in a pole ring of the kind described above. Because of this, the rotor does not have to be made completely out of magnetic material, and also does not have to exhibit a magnetically soft core. This enables the design of an overall lighter rotor. This motor type involves a so-called short-flux-path motor. Such a motor is especially suitable for the configuration according to embodiments of the invention of the electric motor and commutation described above to prevent dry running operation.

In addition, the engine electronics are preferably designed in such a way that commutation takes place based on the counter-EMF (counter-electromagnetic force). In other words, this motor does not require a sensor to determine the rotor position; the rotor position acquisition required for commutation takes place via the counter-EMF.

The engine electronics are preferably designed in such a way that positively controlled commutation takes place on motor startup up to a preset speed or for a preset time. In other words, no regulated operation of the kind encountered during normal motor operation takes place while starting the motor. Only after a preset time has elapsed or once a preset speed has been reached does the motor switch to regulated operation, i.e., commutation is then operated regulated, so that the motor preferably runs with its synchronous speed.

It is further preferred that the engine electronics be designed in such a way as to be able to detect the shutdown of the motor based on its current electrical values. As a result, no additional sensors are needed to determine whether the rotor is rotating or standing still. Rather, the shutdown can be determined from the electrical variables for current and/or voltages that are supplied to the stator of the electric motor from the engine electronics.

In order to ensure a reliable startup of the electric motor, the engine electronics are preferably also designed in such a way that they can detect a shutdown of the electric motor, and introduce a renewed startup process if a shutdown has been detected. For example, this is advantageous if the motor should stand idle for a brief period, for example due to an air bubble in the conveyor line of a pump driven by the motor. In such a case, reliable commissioning can still be achieved via several startup attempts.

However, the engine electronics are preferably designed in such a way as to issue an error message given a renewed shutdown of the electric motor after a specific number of startup processes or after a preset period in which several startup processes have been implemented. In particular, additional startup processes are then also terminated. For example, this makes sense if the conveyor line and pump driven by the electric motor must be manually vented. In a case where the can is filled with air, the engine electronics can initially perform a sequence of several startup attempts. Given only a slight amount of air in the can, the motor will then start up, after which the commissioning of the motor combined with the operation of a pump impeller joined with the rotor will cause liquid to again fill the can. The motor then switches back to its normal operation. However, if a larger quantity of air is present not just in the motor, but also in an adjoining conveyor or fluid line, for example, normal motor operation might not be possible despite several startup processes, and the motor may stand idle once again. In this case, the engine electronics will then issue an error message, for example so as to prompt manual venting of the line.

It is especially preferred that the pumping set involve a recirculation pumping set, and in particular a heating recirculation pumping set or an industrial water recirculation pumping set. Industrial water recirculation pumping sets are used for the hot water supply of buildings, for example, so as to circulate the hot water in the hot water lines of the building, so that hot water can thereby always be provided at the taps.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
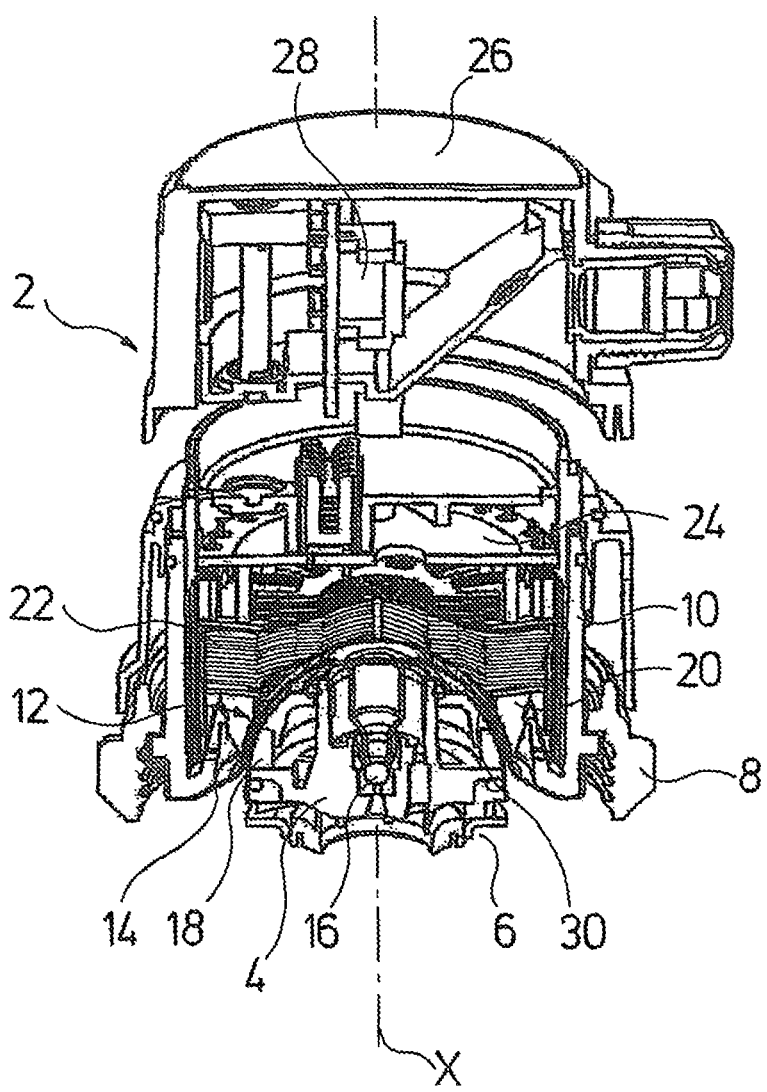
FIG. 1 An example for a pumping set with an electric motor according to an embodiment of the invention, and FIG. 2 A cut detailed section of the stator.

FIG. 1 presents a partially exploded view of a partially cut electric motor 2 of a pumping set, wherein the rotor 4 of the electric motor 2 carries an impeller 6 on an axial side. This impeller 6 runs in a pump housing (not shown here), which is connected to the stator casing 10 with the retainer nut 8.

The electric motor 2 is a wet running electric motor, in which the stator 12 and rotor 4 have arranged between them a can 14 in the form of a separating calotte, which divides the rotor chamber in which the rotor 6 turns from the stator chamber inside the stator casing 10 in which the stator 12 is located. The motor according to the invention involves a spherical motor, which exhibits a rotor 4 with a semispherical surface. Accordingly, the can 14 is also dome-shaped or semispherical. The rotor 4 is rotatably mounted on a ball bearing 16. This allows the rotor 4 to turn not just around the longitudinal axis X, but also oscillate around the ball bearing 16, radially to the rotational axis X. The spherical surface of the rotor 4 and dome-shaped can 14 are here situated concentrically relative to each other and the ball bearing 16.

The rotor 4 is designed as a permanent magnetic rotor, and exhibits a pole ring 18 made out of magnetic material. The magnetic poles of the rotor are formed within this pole ring 18. The pole ring 18 lies opposite the end faces of the pole webs 20 of the stator 12. The extension of the pole ring 18 in the width direction is roughly identical to the extension of the face ends of the pole webs 20 along the dome-shaped surface of the can 14 in the direction transverse to the circumference. The pole webs 20 each carry a coil 22. The electrical connections of the coils 22 are electrically connected with a circuit board 24 arranged inside the stator casing 10. This circuit board 24 carries the engine electronics for starting up and commutating the electric motor. The engine electronics on the circuit board 24 are powered by a power supply unit 28 situated in a terminal housing 26. Viewed in the direction of the rotational axis X, the terminal housing 26 is positioned axially on the stator casing 10.

During normal operation of the pumping set, the interior of the can 14 is filled with liquid, in particular water, between the can 14 and surface 30 of the rotor. The liquid between the can and rotor leads to elevated friction in this area, and hence causes a portion of load to act on the electric motor. Accordingly, the resistance of the liquid in the impeller 6 generates a load that acts on the motor.

In the invention, the engine electronics are configured in such a way that the electric motor is only electronically commutated in the manner required for operating the electric motor if enough of a load is acting on the electric motor. For example, commutation can be configured in such a way that, as soon as the impeller 6 runs dry and/or the can is not filled with liquid, and hence the rotor 4 runs dry, the load acting on the electric motor is diminished by an amount where the desired commutation no longer takes place. In other words, electronic commutation would be terminated in such an operating state, and the electric motor would no longer run. The engine electronics on the circuit board 24 ideally detect this, and in such an event initiate several startup attempts. If the rotor 4 still fails to rotate after a specific period or a specific number of startup attempts, the engine electronics ideally issue an error message, and electric motor operation is initially suspended.

Commutation in the engine electronics on the circuit board 24 preferably takes place based on the counter-EMF that is induced in the coils 22 during the rotation of the rotor 4.

Figure 2:
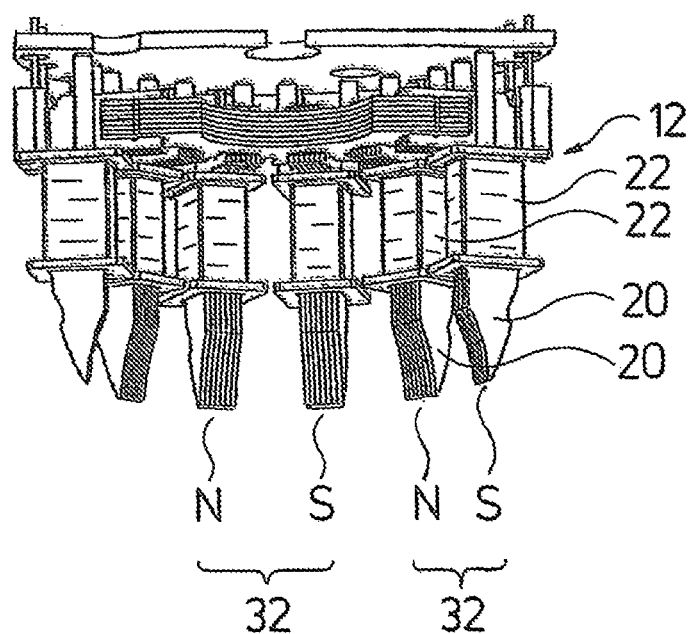

FIG. 2 shows a split detailed view of the stator 12. The individual pole webs 20 with their coils 22 are wired in such a way that two adjacent pole webs 20 always form a stator pole pair 32, wherein the pole webs 20 of the stator pole pairs 32 are magnetically polarized in an opposite direction, i.e., one of the pole webs 20 forms a magnetic north pole N, while the other pole web 20 forms a magnetic south pole S. The pole ring 18 of the rotor 4 also exhibits alternating magnetic north and south poles, which here are not shown in any greater detail. The annular configuration of the pole ring 18 makes a magnetic flux diametrically through the rotor impossible. Rather, the rotor 4 is designed in such a way that a magnetic flux always takes place between two neighboring rotor poles, i.e., in the circumferential direction of the pole ring 18. A Halbach magnetization is here an especially preferred configuration.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A pumping set comprising an electric motor, which includes a stator (12), a rotor (4) a can (14) arranged between the stator (12) and rotor (4), the can being configured to form a rotor chamber in which the rotor turns and which receives a liquid to be conveyed, and at least one impeller (6) linked with the rotor, wherein the electric motor is designed as a spherical motor with a can (14) in the form of a separating calotte and a semispherical rotor (4), and wherein the electric motor has engine electronics configured to electronically commutate the electric motor, and the electric motor and commutation are configured such that the commutation only takes place correctly if a load caused by liquid in the can (14) and the impeller (6) is acting on the electric motor, and when a portion of the load is omitted, the rotor does not properly interact with the configured commutation, causing the rotor to stop.

2. The pumping set according to claim 1, wherein the rotor (4) is mounted such that, in addition to rotating, the rotor can float in a radial direction.

3. The pumping set according to claim 1, wherein the rotor (4) includes a pole ring (18) made out of magnetic material, which incorporates permanent magnetic rotor poles.

4. The pumping set according to claim 1, wherein the stator (12) includes several stator pole pairs (32) that each are formed by two adjacent stator poles (20), which are configured to generate oppositely polarized magnetic fields in a radial direction, and wherein the rotor (4) includes a plurality of magnetic rotor poles distributed over the circumference, and is configured to enable a magnetic flux between two adjacent rotor poles.

5. The pumping set according to claim 1, wherein the engine electronics are configured such that commutation takes place based on a counter-EMF.

6. The pumping set according to claim 1, wherein the engine electronics are configured such that positively controlled commutation takes place up to a preset speed or for a preset time.

7. The pumping set according to claim 1, wherein the engine electronics are configured to detect the shutdown of the motor based on current electrical values.

8. The pumping set according to claim 1, wherein the engine electronics are configured to detect a shutdown of the electric motor, and introduce a renewed startup process if a shutdown has been detected.

9. The pumping set according to claim 1, wherein the engine electronics are configured to issue an error message after a specific number of startup processes or after a preset period given a stoppage of the electric motor.

10. The pumping set according to claim 1, wherein the pumping set is designed as a recirculation pumping set.

11. The pumping set according to claim 10, wherein the pumping set is a heating or industrial water recirculation pumping set.

* * * * *